United States Patent [19]
König et al.

[11] Patent Number: 5,934,413
[45] Date of Patent: Aug. 10, 1999

[54] METHOD AND A DEVICE FOR ORDER PICKING

[75] Inventors: Heinz König, Wels; Wolfgang Gabler, Bad Wimbsbach/Neydharting; Werner Von Hacht, Uttenreuth, all of Germany

[73] Assignee: TGW Transportgeräte Gesellschaft mbH, Wels, Austria

[21] Appl. No.: 08/776,978
[22] PCT Filed: Jun. 14, 1996
[86] PCT No.: PCT/AT96/00108
§ 371 Date: Feb. 5, 1997
§ 102(e) Date: Feb. 5, 1997
[87] PCT Pub. No.: WO97/00218
PCT Pub. Date: Jan. 3, 1997

[30] Foreign Application Priority Data

Jun. 16, 1995 [AT] Austria ......................................... 328/95

[51] Int. Cl.⁶ ................................................... B65G 1/04
[52] U.S. Cl. ............................................. 186/56; 414/331
[58] Field of Search .................. 186/55, 56; 364/478.02, 364/478.03, 478.04, 478.05; 414/273, 331

[56] References Cited

U.S. PATENT DOCUMENTS 4,806,072  2/1989  Karashima ............................. 414/331
5,222,855  6/1993  Bernard, II et al. ................... 414/331

FOREIGN PATENT DOCUMENTS 0 645 322   3/1995   European Pat. Off. .
2 645 992  10/1990   France .
37 31 735   2/1989   Germany .
195 01 883  8/1995   Germany .
666 668     8/1988   Switzerland .

*Primary Examiner*—F. J. Bartuska
*Attorney, Agent, or Firm*—Collard & Roe, P.C.

[57] ABSTRACT

A system for picking an order for articles of the same type contained in store keeping units comprises removing respective store keeping units at a receiving station from large units wherein the store keeping units are assembled, each large unit containing only articles of the same type. Each store keeping unit is placed on a separate carrier bearing a code, data of each such store keeping unit is supplied to a computer and these data are allocated to the carrier. Each carrier is then inserted into storage containers also bearing a code, the storage containers with the inserted carriers loaded with the store keeping units are then transported to an intermediate storage area for intermediate storage, and the order is then picked by removing respective carriers loaded with the store keeping units identified by the data from the storage containers, inserting the carriers into consignment containers also bearing a code, transporting the consignment containers with the inserted carriers to a discharge station, and unloading the consignment containers according to a predetermined packing order.

11 Claims, 6 Drawing Sheets

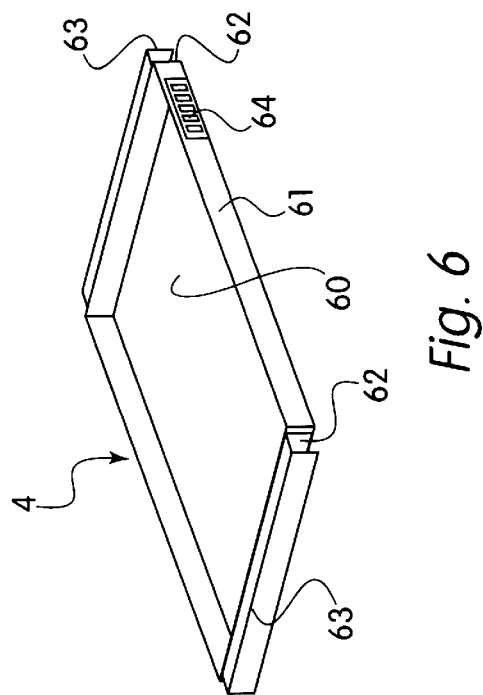
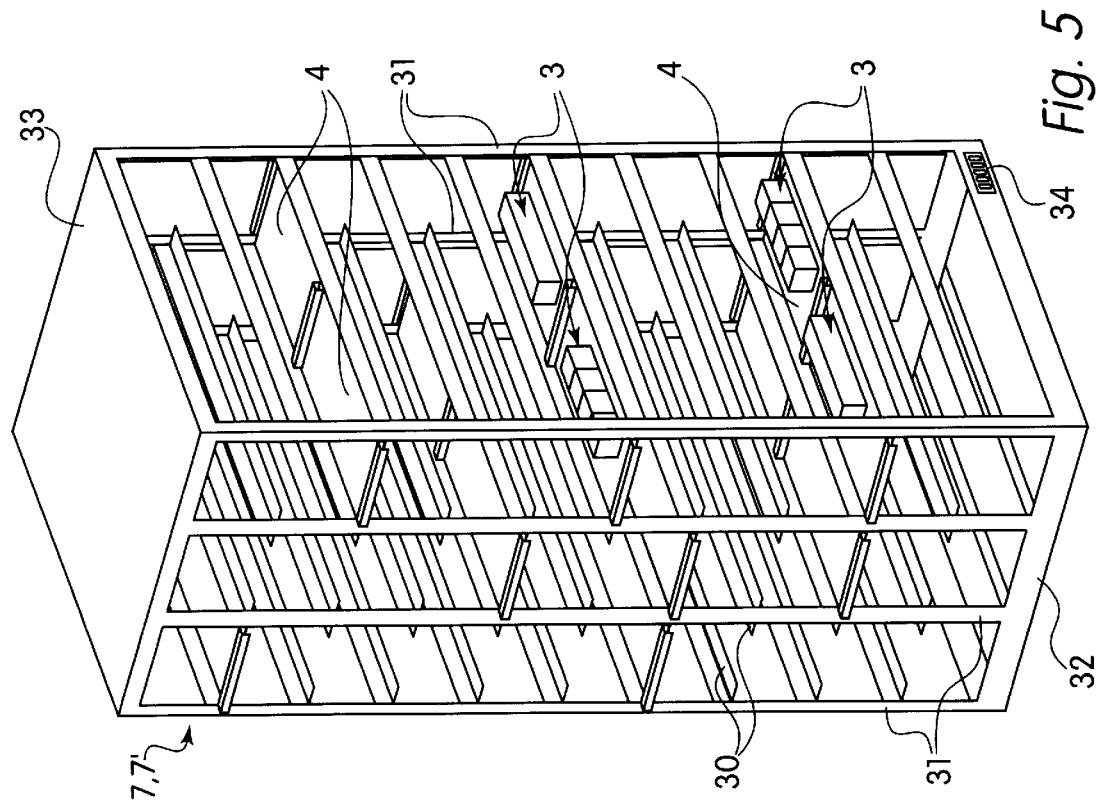

METHOD AND A DEVICE FOR ORDER PICKING

The invention relates to a method and device for order picking.

Such a method is used in particular for the delivery of shops, e.g. food stores, or of branches of a trading chain, in particular a supermarket chain, by a wholeseller or a central storehouse of a trading chain.

The term "order picking" shall be understood as being the assembly of several articles pursuant to the order of an ordering party.

The term "store keeping unit" shall mean a specific number, which may also only be one piece, of the same articles, with this number of similar articles being connected and representing the minimum delivery quantity for an order. This connection of the number of same articles forming a store keeping unit can occur by way of a common plastic envelope or also be achieved by glueing the individual articles to a relatively thin carrier having only a low tenacity such as a piece of cardboard, for example.

The term "article" shall be understood as being a specific product in a specific packaging size. In other words, a product "A" in a packaging size "B" constitutes an other product than the product "A" in a packaging size "C" or a product "D" in the packaging size "B".

The term "article-pure" shall therefore mean that the respective unit, e.g. the large unit, is composed of a plurality of merely one article.

The term "large unit" shall be understood as being a plurality of connected store keeping units which are combined into one unit and are delivered jointly as a unit, mostly on a pallet.

In known methods of this kind the individual store keeping units are transported to fixed shelves in the warehouse, stored there and removed therefrom for compiling the individual consignments or orders. According to a number of methods this occurs manually, with the removed goods being placed on a conveyor belt which is provided with pushing devices which push off the goods laterally from the packing stations.

Furthermore, methods have also become known wherein the goods are issued to a conveyor device by output devices which are controlled by a computer. These conveyor devices move at a constant speed past the output devices. Each order is allocated a specific region of the conveyor device which also moves along. Containers are filled with the loose heaps of articles or heaps of store keeping units which are made available for an order, with the containers being situated on a conveyor belt which leads to the packing stations. The containers are taken from the conveyor belts there and packed for delivery.

These methods lead to the disadvantage however that the goods have to be frequently transferred from one conveying means to another one. This can lead to damage in the packaging, because the store keeping units must be conveyed and handled loosely and without protection. A further adverse aspect is that for reducing unnecessary garbage the amount of packaging should be reduced. Any damaged packagings of the goods constitute a serious problem with respect to the frictionless sequence of the flow of goods. Moreover, it is necessary in this method to carry out the order picking at a time at which the manual packaging stations are manned. The amount of the apparatuses in the performance of this method constitutes a serious problem with respect to the amount of space needed, with the sorter being of particular importance.

It is the object of the invention to provide a method in which a substantial careful treatment of the goods is ensured and in which substantially fully automatic order picking is possible.

This is achieved in accordance with the invention with a method.

As a result of the proposed measures it is ensured that the store keeping units of the goods only have to be grasped during the breakdown of the large units or during the loading of the ware carriers and during the removal of the ware carriers or during the loading of the transport containers. This ensures a very substantial careful treatment of the goods or their packaging, because during the assembly of the consignments not the goods per se, but only the ware carriers which carry them have to be handled.

The goods could also be delivered together with the ware carriers and be connected thereto. In such a case there is a particularly careful treatment of the packaging of the goods, because a continuous handling by means of the ware carriers is possible, i.e. including the manipulations during the breakdown of the large units and the packing of the transport container. In this respect it is advisable when the ware carriers delivered with the goods correspond in their dimensions to the receiving dimensions of the storage containers and consignment containers, because in such a case it is possible to omit separate ware carriers and the dual-use packages correspond to the ware carriers. The term "dual-use packages" shall be understood as being containers which are delivered in the filled condition and are taken back empty for refilling by the producer of the respective ware.

In such a case it is necessary that the store keeping units delivered on ware carriers are provided with a respective code and the respective data are entered into the computer. Each such ware carrier must be provided with a separate code, as is also the case in the ware carriers provided for one-by-one reception in the store keeping units.

The ware carriers can be formed by trays, boxes or the like. The relevant aspect is only that their dimensions correspond to the receptacles of the warehouse and consignment containers and are provided with sufficient stability.

The proposed measures also lead to the advantage that all goods of a consignment can be supplied to one of several packing stations and it is possible to omit the arrangement of a sorter which requires a large amount of space. Up until now a sorter usually supplied the store keeping units of a consignment to several adjacently arranged packing stations which were usually operated by one person jointly.

The proposed measures also enable the determination of a packaging order which is optimal for the prevention of transport damage. This is not possible in the known methods in which the consignments are compiled in several heaps of articles or heaps of store keeping units on a conveying device and are pushed off by means of pushing devices laterally to the packing stations, because no order can be maintained within these heaps owing to the lateral pushing off of these heaps. The adherence to a packing order is also not possible in the filling of containers as provided for in a known method with a loose heap of articles or heaps of store keeping units allocated to one order. A specific packing order can occur in the known methods only directly in the zone of the packing station during the manual filling of the transport containers after the arrival of all store keeping units belonging to a consignment.

As usually there is only little time for the filling of the transport containers, particularly in peak periods, numerous deviations from the packaging order occur. This leads to a considerable amount of transport damage.

A method for the renewed charging of display cases of a salesroom is known from DE 37 31 735 A. In this method large units are brought to worktables where storage containers from a standby zone are also brought. The large units are broken down and the ware carriers are filled with the articles taken from the large units, with the ware carriers having to take up an actually undefined number of articles according to their capacity. There is no connection of a specific number of similar articles into store keeping units.

The filled ware carriers are inserted into the storage containers and thereafter the filled storage containers are brought to a removal and packing station which simultaneously acts as an intermediate storage.

In this packing station the ware carriers plus the loose articles situated thereon are taken from the storage containers and inserted into a ware resupply carriages and pushed into the salesroom with them. If during the refilling of the display cases individual articles should remain on the ware carriers in the ware resupply carriages, then the ware resupply carriages are brought back to the packing station plus the articles remaining thereon. The empty ware resupply carriages are then brought into a standby zone.

This known method, however, does not concern an order picking method, but relates to a method for filling display cases in a salesroom in which there is no allocation to specific orders and also no compilation of similar articles into store keeping units.

There is also no quantitative allocation of the individual articles to a specific ware carrier and there is also no encoding of the ware carrier and no allocation of the individual ware carriers to a specific article.

It is possible to supply the removed store keeping units in the sequence of their withdrawal, which occurs according to a predetermined packing order, to the packing stations in a simple way. This ensures a respective adherence to the intended packaging order, with simply conveyor belts or the like being used for supplying the store keeping units.

Advantageously consignments can be prepared and intermediately stored and can thereafter be brought to a packing station continuously, so that no idle times occur in this station. Moreover, it is also possible to prepare incomplete consignments and to complete the same after receiving the last order items of the respective consignment. In other words, it is possible by the proposed measures to supplement a consignment of a specific branch or a specific shop after its compilation by a subsequent supplementary order of this branch or this shop.

In this way it is possible to avoid the previously common peak periods during the order picking shortly before the beginning of the despatch of the goods. This is of particular importance in distribution warehouses of foodstuff branch chains whose cash registers are connected with the computer of the warehouse. In the event of a sale of a quantity of an article in a specific branch, which quantity corresponds to the store keeping unit, the computer can start the order picking for such a store keeping unit for the respective branch.

It is a further object of the invention to provide a device for carrying out the method in accordance with the invention. This device is proposed for securing the most careful treatment of the goods and for securing the optimal guidance of the method in accordance with the invention.

The proposed measures ensure a very careful treatment of the goods and their packaging, because the goods are handled within the warehouse only by the ware carriers and therefore not the goods per se, but the ware carriers which carry them are shifted around and regrouped, which only occurs over relatively short paths. Regroupings over larger distances can be made in such a way that the storage or consignment containers plus the inserted ware carriers are moved. Moreover, the transportable storage and consignment containers also give the possibility to keep the paths very short, because for the inflow of the goods and the despatch of the goods it is not necessary to drive around any fixed shelves which was customary to date. Moreover, these measures also lead to the highest possible amount of flexibility in the division of the warehouse space for the reserve store for the goods to be consigned and storage space for the provision of the consigned goods situated in the consignment containers. This allows keeping the entire storage space at a minimum, because none of these areas has to be designed for the maximum size required for the respective handling of goods.

Simultaneously it is also ensured that the individual ware carriers are securely detected by the computer via a reader device and a logical link is made by the data entered in the computer with the individual articles and store keeping units by the entry of the ware-specific identifier. This also allows for a determination of the packing order, with this determination being made only after the completion of a consignment or only directly prior to the removal of the ware carrier at the withdrawal station.

Advantageously the ware carriers inserted into the storage containers can be removed very easily and can be inserted into the receptacles of the consignment containers.

According to a preferred feature, a replacement contingent of storage and consignment containers is provided.

In accordance with another preferred feature, the available area within a storehouse can be used optimally and the paths within the storehouse can be kept short.

Two transport carriages for bringing in and removing storage and consignment containers to and from two order picking areas may preferably be used, with these two order picking areas being processed by a single order picking device.

The invention will now be explained in closer detail by reference to the enclosed drawing, wherein:

FIG. 1 schematically shows the sequence of the method in accordance with the invention;

FIG. 2 schematically shows a warehouse for carrying out the method in accordance with the invention in a top view;

FIG. 3 schematically shows a warehouse for carrying out the method in accordance with the invention in a side view;

FIG. 4 schematically shows a loading station;

FIG. 5 shows an axonometric representation of a storage container;

FIG. 6 shows an axonometric representation of a ware carrier and

Figure 7:
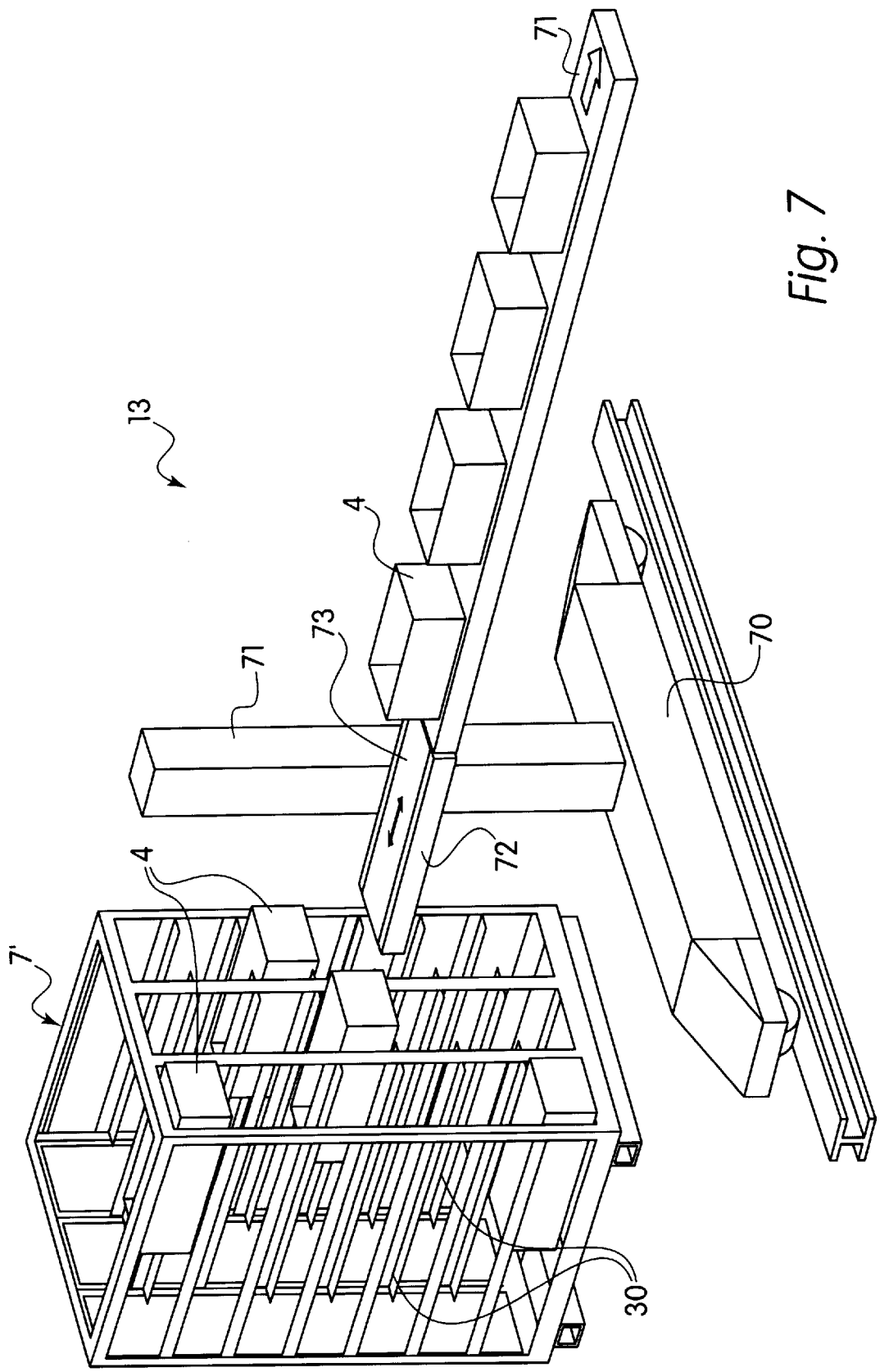

FIG. 7 schematically shows a withdrawal station.

Figure 1:
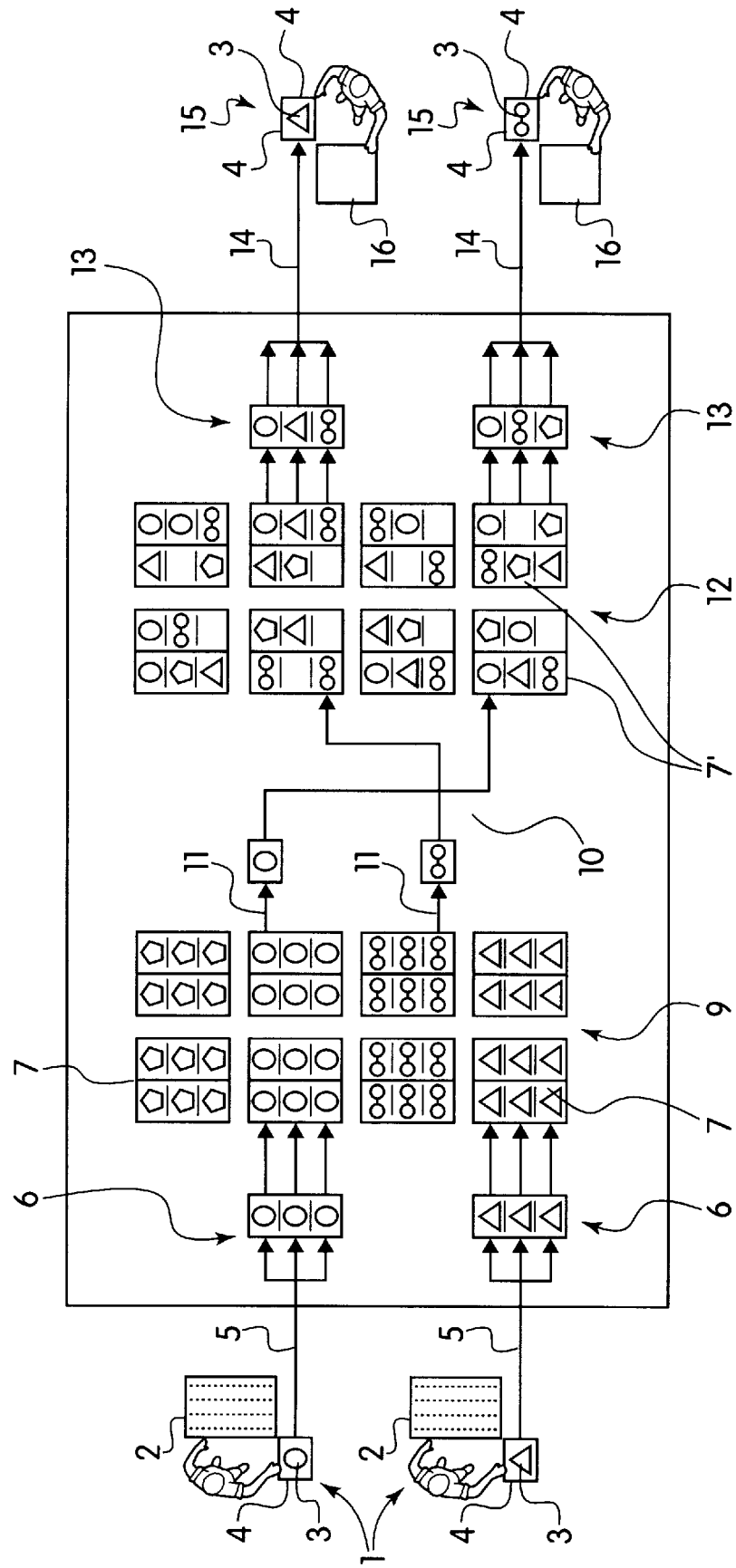

In the warehouse for carrying out the method in accordance with the invention as set out in FIG. 1 there are provided receiving stations 1 in which large units 2, which consist of the store keeping units 3, of the various arriving goods are broken down into the store keeping units 3 and the individual store keeping units 3 are placed on ware carriers 4 when the goods are not supplied with the ware carriers 4 or are not connected to the same. The ware carriers 4 may be dual-use packages of any kind. The relevant aspect is only that their dimensions are suitable for being received in the storage and consignment containers 7, 7' and all these ware carriers 4 at least have the same dimensions in their floor area which corresponds to the receptacles of the storage and consignment containers 7, 7', which can be formed by rails 30 (FIG. 5) for example which project towards the interior thereof and are arranged on the side walls of the containers 7, 7'.

As is shown in FIG. 5, the storage and consignment containers 7, 7' are substantially formed by a rack. This rack is provided with stands 31 which are connected to a floor and a cover plate 33. Rails 30 are attached in regular vertical intervals at the facing sides of the stands 31, which rails are provided with an L-shaped cross section. These rails 30 connect the stands 31 of the front side of the rack with the stands 31 of the rear side of the rack of the storage and consigment containers 7, 7'.

In the embodiment shown, in the storage container 7, or in a similarly arranged consignment container 7', two ware carriers 4 can be pushed successively behind one another into a receptacle formed by two facing rails 30. These storage containers 7 or consignment containers 7' are shown on an enlarged scale in FIG. 5 and are provided with a code 34 on at least one longitudinal side.

As shown in FIG. 6, a ware carrier 4 is provided with a rectangular floor 60 from which project circumferential walls 61. At the narrow sides 62 outwardly projecting hook-like noses 63 are formed on the upper edges of the walls 61. These hook-like noses 63 can be used to hook up adjacent ware carriers 4. In this way it is possible, on pulling out the forward ware carrier 4, to also pull out the rear ware carrier 4 from a storage container 7. On at least one longitudinal side of the ware carrier 4 the same is provided with a code 64.

As can be seen further from FIG. 5, a store keeping unit 3 can consist of several (e.g. three or four) similar articles or also of even only one single article.

Figure 4:
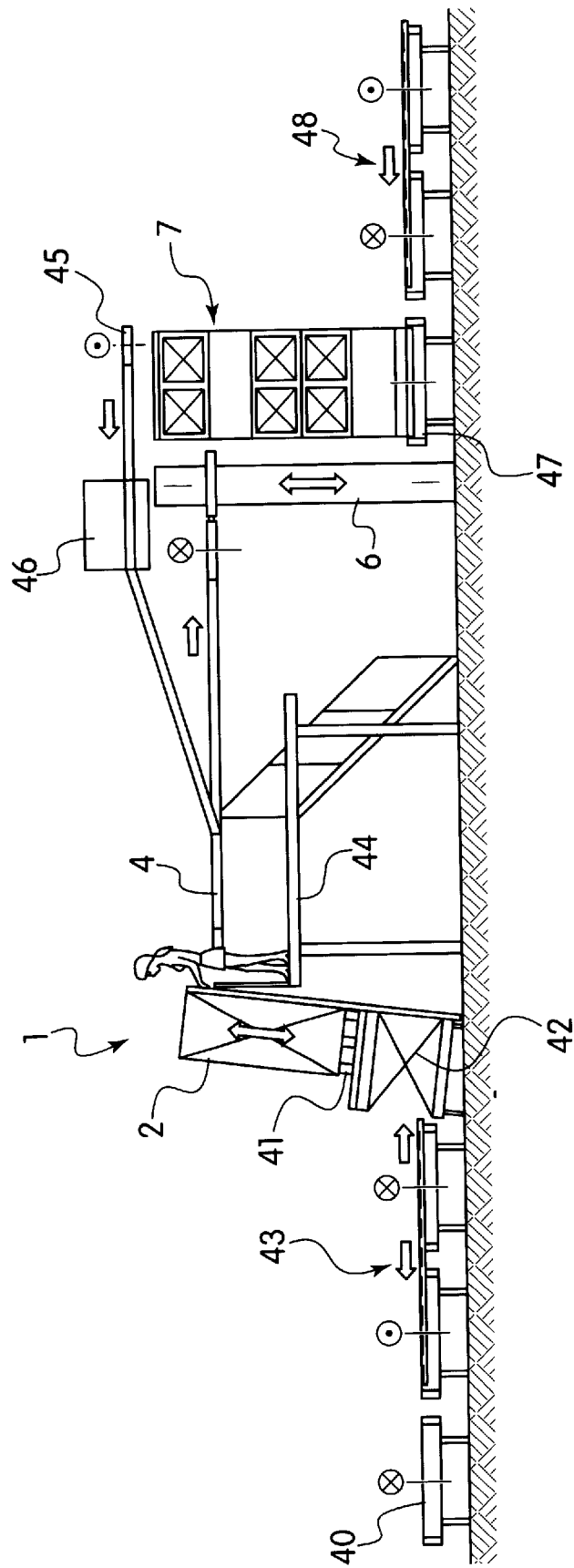

As is shown in FIG. 4, there is provided at each receiving station 1 a feed device 40 such as gravity-roller conveyor for large units 2 of an article each resting on pallets 41. Between this feed device 40 and a lifting device 42 there is arranged a cross conveying device 43 which can engage in the zone between the cover and floor area of each pallet and can displace the same perpendicularly to the feed device 40 in the direction to the lifting device 42. This cross conveying device 43 can also be used to bring empty pallets 41 from the lifting device 42 to the feed device 40 and to remove them from there.

The receiving station 1 is further provided with a pedestal 44 for an operator who removes the individual store keeping units 3 from the large unit 2 and places them on the ware carrier 4.

The empty ware carriers 4, which are provided with a code, are supplied one-by-one to the receiving station 1 via a ware carrier feed device 45 and pile unloader 46 and are each loaded with a store keeping unit 3. Thereafter the loaded ware carriers 4 are supplied to a loading station 6 which pushes the loaded ware carriers 4 into a storage container 7.

In the receiving station 1 the code of the loaded ware carrier is scanned by a reader device (not shown) and forwarded to a computer (not shown).

At the beginning of the withdrawal of the store keeping units 3 from a large unit 2, a code characterizing the articles of the large unit is entered into the computer. A reader device connected with the computer can also be provided in the zone of the cross conveying device 43, which reader reads a code attached to the large unit 2 and forwards it to the computer. In this way the computer establishes a linkage of the data of the articles or the store keeping units 3 with the ware carriers 4 which carry the same.

The loading station 6 is also connected with the computer, in the zone of which there is arranged a receptacle 47 for a storage container 7 which is also provided with a code. The receptacle 47 is also provided with a reader device (not shown) which is connected with the computer.

In this way the computer detects the storage location of every loaded ware carrier 4 in a specific storage container 7.

Figure 2:
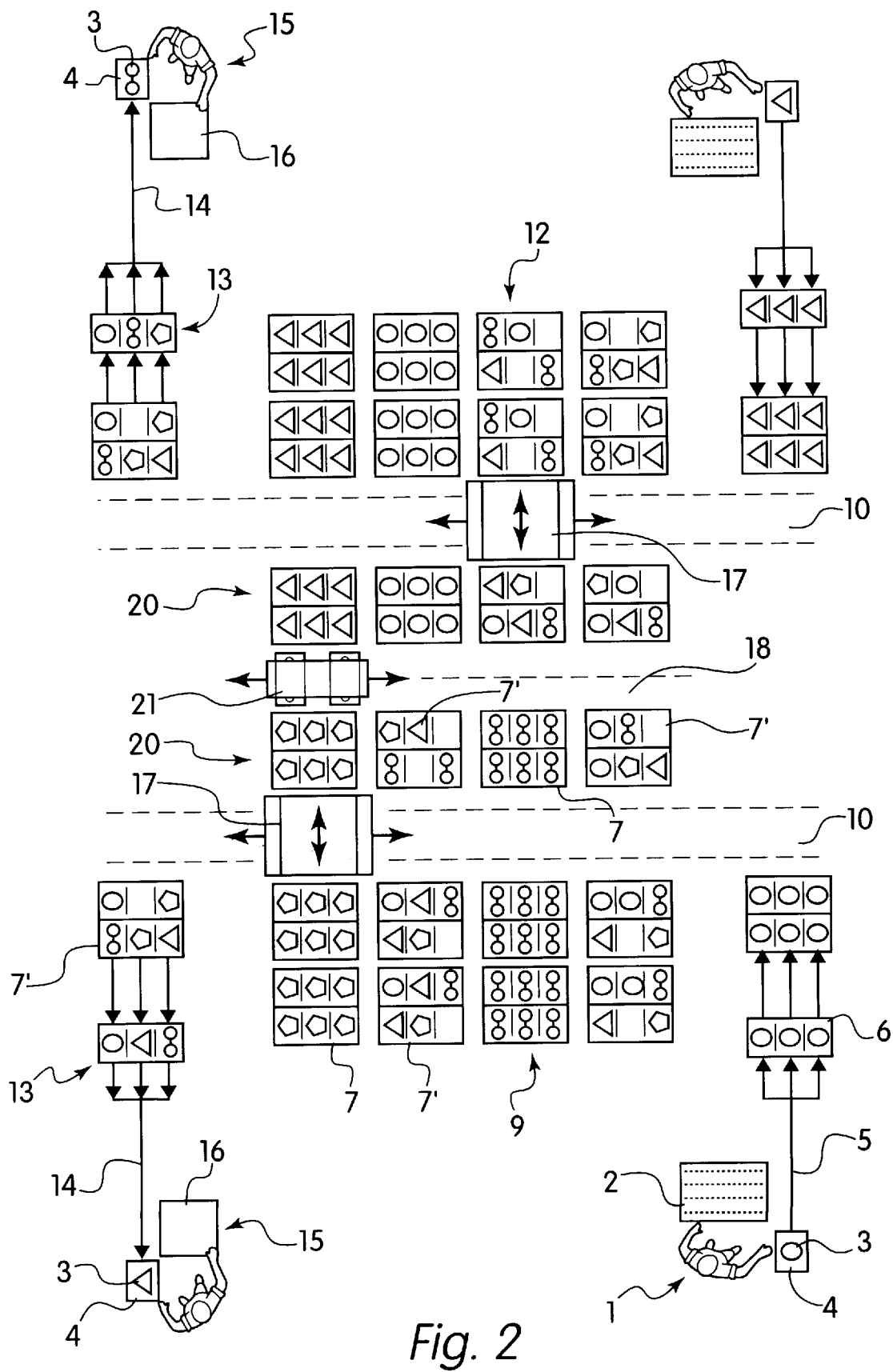
Figure 3:
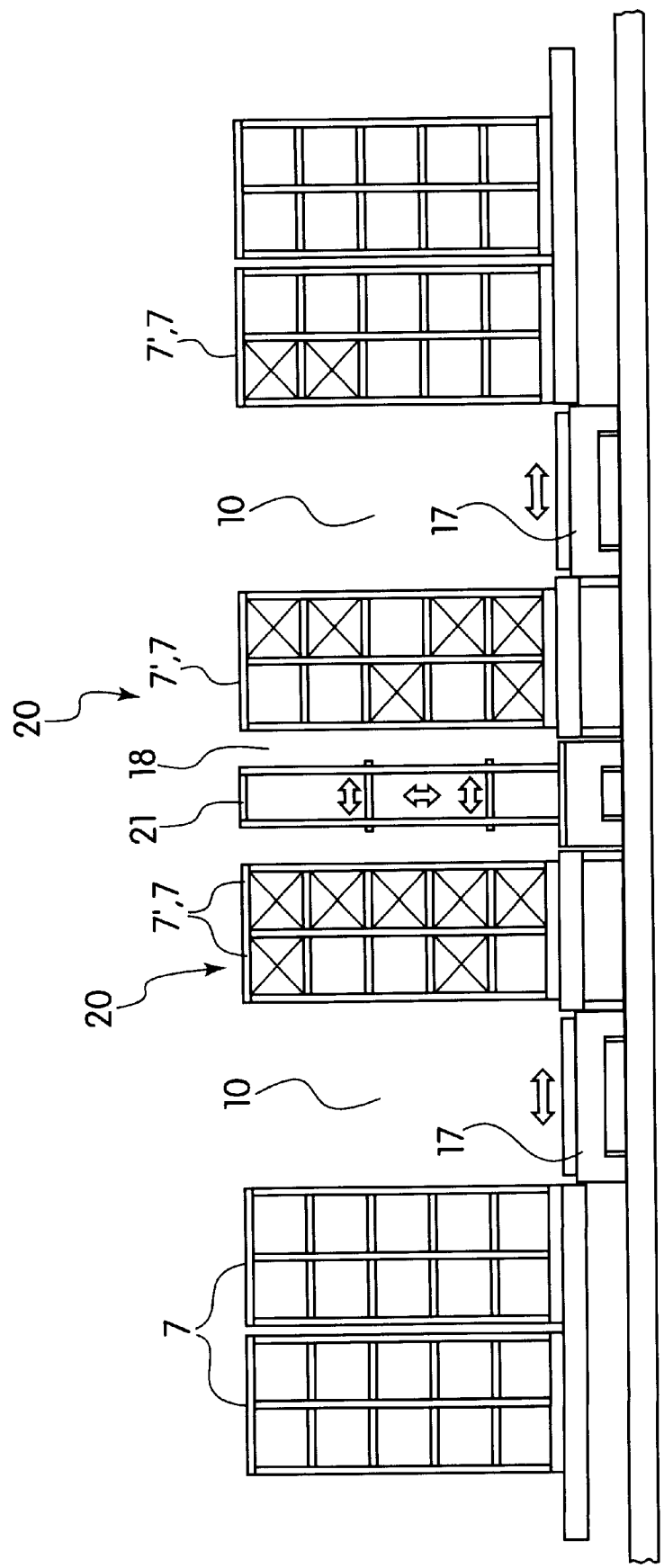

The filled storage containers 7 are supplied to a conveying device via a cross conveying device 48. The conveying device can be formed by a transport carriage 17, as is shown in FIGS. 2 and 3, which is movable on a route 10. The cross conveying device 48 can be arranged on the transport carriage 17. This transport carriage 17 is in connection with the computer and is provided with a sensor (not shown) which detects the path covered by the transport carriage 17 and a reader device (not shown) for detecting the code of the respective storage container 7. This also allows a detection of the respective location of a ware carrier 4 each loaded with a store keeping unit 3. Accordingly, the computer also knows the location of each store keeping unit 3.

Preferably, the storage containers 7 are loaded only with the same articles. It is also possible, however, to load storage containers 7 with different articles, particularly when goods are concerned where only small quantities are handled.

The loaded storage containers 7 are brought into an intermediate storage zone 9 by means of conveying devices and placed there. The individual containers can be placed according to different criteria, e.g. according to the frequency of their handling. (FIG. 1, FIG. 2)

As was already mentioned, the storage containers 7 are provided with several superimposed receptacles for inserting the ware carriers 4, with the distances preferably being the same. Depending on the height of the store keeping units 3 which are disposed on the individual ware carriers 4 and are recognized by the computer owing to the entered ware-specific identifier, the ware carriers 4 are inserted at respective vertical distances into the storage containers 7 by means of the loading device 6 which is controlled by the computer.

The storage containers 7 are provided with a depth which corresponds to an integral multiple larger than one of the length or width of a ware carrier 4, so that several ware carriers 4 can be inserted behind one another in one plane of the storage container 7. The ware carriers 4 are provided with mutually engageable coupling devices on their respective sides 62. These coupling devices are formed by hook-like noses 63 and allow pulling forward the rear ware carrier 4 while pulling out the foremost ware carrier 4. It is also possible that order picking devices 11, 21 are provided with withdrawal devices which can engage sufficiently far into the storage container so that even the rearmost ware carrier can be taken out from the receptacle of the storage container 7 which is formed by the L-shaped rails 30.

Separated from the intermediate storage zone 9 by a route 10 there is provided an erection zone 12 for the consignment containers 7' which are arranged in a constructionally similar way. They are loaded with at least one movable order picking device 11 (not shown in closer detail) with the goods allocated to the respective order, with the ware carriers 4 with the respective store keeping units 3 being withdrawn from the storage containers 7 situated in the respective intermediate storage zone 9 and being inserted into the consignment containers 7' which are also provided with a code. These codes are transmitted to the computer via reader devices arranged on the consignment devices 11 which are preferably controlled by the computer. This allows for fully automatic order picking.

The loaded consignment containers 7' can either be intermediately stored in the erection zone 12 or be supplied immediately to a withdrawal station 13. In this station the ware carriers 4 including the store keeping units 3 which are disposed thereon are taken from the consignment container 7'. During the withdrawal of the ware carriers 4 with the respective store keeping units a packing order is adhered to which is determined by the computer on the basis of the strength of the consigned store keeping units. More robust articles such as glasses with pickled fruits, washing powder packages, etc. are taken first and the most sensitive packages such as packages of eggs are taken last.

The ware carriers 4 are supplied to a packing station 15 via a conveying device 14 in the sequence of their withdrawal from the consignment container 7'. There the store keeping units 3 are taken from the ware carriers 4 and packed into transport containers 16. In the case that ware carriers 4 are supplied with connected goods, they can be packed in connection with the store keeping units into a transport container 16.

The emptied consignment containers 7' are simultaneously brought into a standby zone (not shown) by means of a movable transport device (not shown) from where the containers 7, 7' are taken again at a later time and are brought as storage containers 7 to a loading station 6 or into the erection zone 12 for consignment containers 7'.

FIG. 2 shows a possible embodiment of a warehouse for carrying out the method in accordance with the invention. A route 10 separating the intermediate storage zone 9 from an order picking zone 20 is provided. A transport carriage is movable in this route 10 which is provided with a platform which is extendable transversely to the driving direction for receiving the storage container 7 and is controlled by a computer (not shown). The transport carriage 17 is provided with a reader device connected to the computer for detecting the code of the respective storage or consignment container 7, 7'.

This transport carriage 17 is used to despatch the storage containers 7 from the loading station 6 and to place them in the intermediate storage zone 9. When required, the storage containers 7 are transferred from the intermediate storage zone 9 into the order picking zone 20.

In the represented embodiment with two opposite receiving stations 1 there are provided two order picking zones 20 which are separated by a route 18 on which an order picking device 21 is movable. It is connected with and controlled by a computer. The order picking device 21 removes from the storage containers 7 the store keeping units 3 designated for a specific order including the ware carriers 4 which carry the same, and pushes them into the consignment container 7'.

The filled consignment containers 7' can be transferred from the order picking zone 20 to the loading station 13 by means of the transport carriage 17 if need be and can be unloaded. If a larger number of orders is prepared and these orders are not immediately delivered as can be the case during night hours for example, the filled consignment containers 7' can be transferred with the transport carriages 17 from the order picking zone 20 to a separate erection zone for the consignment containers 7'. The filled consignment containers 7' can also be transferred to the intermediate storage zone 9, as is shown in FIG. 2. This leads to mixed erection zones of variable sizes for the storage containers 7 and consignment containers 7'. At the beginning of the despatch the prepared consignment containers 7' can be supplied in the desired sequence to the withdrawal stations 13.

In this embodiment it is favourable if one route 18 for an order picking device 21 is provided between two routes 10 for the transport carriages 17. This leads to order picking zones 20 (FIG. 2, FIG. 3) on either side of the routes 18 for the order picking device 21.

The order picking device 21 and the transport carriages 17 are controlled by the computer. As was already mentioned, the transport carriages 17 are provided with reader devices for detecting the codes of the containers 7, 7' and the order picking device 21 is provided with reader devices for detecting the codes of the ware carrier 4.

FIG. 7 schematically shows a withdrawal station 13 which is connected with and controlled by the computer. The withdrawal of the ware carriers 4 from a consignment container 7' occurs according to the packing order for the individual store keeping units 3. As was already mentioned, this packing order is determined according to the strength of the various store keeping units, so that at first the store keeping units 3 which can resist pressure to the highest extent are taken first and the most sensitive store keeping units are taken last from the consignment container 7'.

The ware carriers 4 are shown in FIG. 7 as relatively high boxes. These boxes are provided with a length which is larger than half the depth of the consignment containers, so that it can receive only one ware carrier in a receptacle formed by two facing rails 30. This is to show that the shape of the ware carrier 4 can be chosen by the designer substantially freely. It is only necessary to ensure that the ware carriers can be inserted in the storage or consignment containers 7, 7'.

The ware carriers are favourably made from an unburnable material such as metal.

The withdrawal station 13 is provided with a rack 70 parallel to the front side and vertical to the longitudinal extension of the rails 30 of the consignment containers 7'. This rack is provided with a vertical stand 71 on which a support 72 is held vertically displaceable.

This support 72 is provided with a device 73 which grasps the ware carriers 4 in the consignment container 7', transports the ware carriers 4 in the direction towards a conveyor belt 74 and can be arranged in any desired way. For example, such a device can be formed by a telescopic extension arm which is extendable in the horizontal direction, which can be inserted into the consignment container 7' and on which a separately controllable conveyor belt is arranged.

In the case of a suitable arrangement of the ware carriers 4, the device 73 can also be arranged according to DE 195 01 883 A.

During the withdrawal the support 72 at first accesses the position of the most sturdy store keeping unit and takes it out with the respective ware carrier 4 from the consignment container 7'. Thereafter the conveyor belt 74 is accessed by the displacement of the rack 70 and the support 72 and the ware carrier 4 is transferred to the conveyor belt 74 which conveys the ware carrier 4 to a packing station 15 (not shown). Thereafter there is accessed the position of the ware carrier 4 with the store keeping unit following in packing order and the aforementioned process is repeated until the consignment container 7' is completely empty.

The consignment container 7' stands at a precisely defined position to which it was brought by a transport carriage 17.

We claim:

1. A method for picking an order for articles of the same type contained in store keeping units, which comprises the steps of (a) removing respective ones of the store keeping units at a receiving station from large units wherein the store keeping units are assembled,
    (1) each large unit containing only articles of the same type,
(b) placing each one of the store keeping units on a separate carrier bearing a code, (c) supplying data of each store keeping unit placed on the carrier to a computer and allocating said data to said carrier, (d) inserting each carrier loaded with a respective one of the store keeping units into storage containers also bearing a code, (e) transporting the storage containers with the inserted carriers loaded with the store keeping units to an intermediate storage area for intermediate storage, and (f) then picking the order for a respective one of the articles of the same type by (1) removing respective ones of the carriers loaded with the store keeping units identified by said data from the storage containers, (2) inserting the respective carriers loaded with the store keeping units into consignment containers also bearing a code, (3) transporting the consignment containers with the inserted carriers loaded with the store keeping units to a discharge station, and (4) unloading the consignment containers according to a predetermined packing order.

2. The method of claim 1, wherein the storage containers are located in the intermediate storage area during picking the order.

3. The method of claim 1, wherein the storage containers are located in a separate order picking area during picking the order.

4. The method of claim 1, wherein the removed carriers loaded with the store keeping units identified by said data are supplied from the discharge station to a packing station in the same sequence in which they have been unloaded from the consignment containers, and the store keeping units are packed into transport containers in the sequence in which they have arrived at the packing station.

5. The method of claim 1, wherein the consignment containers are stored in an intermediate storage area.

6. A device for picking an order for articles of the same type contained in store keeping units, which comprises (a) a receiving station for large units wherein the store keeping units are assembled, the receiving station comprising (1) an input device connected to a computer and (2) a delivery device for separate carriers for the store keeping units, each separate carrier bearing a code identifying the articles of the same type contained in the store keeping units placed on the separate carriers, (b) a reader device connected to the computer for detecting the codes of the carriers, (c) a storage for the carriers whereon the store keeping units are placed, the storage comprising (1) transportable storage containers and consignment containers including holding means for receiving the carriers whereon the store keeping units are placed, (d) at least one transport carriage for the containers and movable along a predetermined path, (e) at least one movable device for picking the order for articles of the same type contained in the store keeping units, the movable order picking device comprising (1) means for removing respective ones of the carriers loaded with respective ones of the store keeping units from the storage containers, and (2) means for inserting the respective carriers loaded with the store keeping units into respective ones of the consignment containers, (3) the transport carriage and the movable order picking device being connected to the computer, (f) a discharge station for removing the respective carriers loaded with the store keeping units from the consignment containers, the discharge station being connected to the computer, and (g) a packing station for loading transport containers with the removed carriers loaded with the store keeping units.

7. The device of claim 6, wherein the storage and consignment containers comprise receptacles for the carriers loaded with the store keeping units, and the means for removing and inserting the respective carriers loaded with the store keeping units are insertable in the receptacles.

8. The device of claim 6, wherein the storage containers and the consignment containers have the same structure.

9. The device of claim 6, comprising differently sized intermediate storage areas for the storage and consignment containers.

10. The device of claim 6, comprising an intermediate storage area for the storage containers, an order picking area, the predetermined path for the transport carriage extending between the intermediate storage area and the order picking area, and a path for the movable order picking device extending parallel to the predetermined path and adjacent the order picking area.

11. The device of claim 10, wherein a respective one of the order picking areas extends at each side of the path for the movable order picking device.

* * * * *

UNITED STATES PATENT AND TRADEMARK OFFICE
CERTIFICATE OF CORRECTION

PATENT : 5,934,413
DATED : August 10, 1999
INVENTOR(S) : KONIG ET AL

It is certified that error appears in the above-identified patent and that said Letters Patent is hereby corrected as shown below:

On the title page, column 1, line 2 of item [75], change "Wimbsbach" to --Wimsbach--; after "Neydharting", insert --both of Austria--; and on line 3, change "all of Germany" to --Germany--.

Signed and Sealed this

Sixth Day of June, 2000

Attest:

Q. TODD DICKINSON

Attesting Officer

Director of Patents and Trademarks